Aug. 3, 1965 YORIYUKI NIEDA 3,198,988
NON-CONTACT POINT RELAY FOR A.C. AND D.C. HAVING
DIRECTIONAL AND TIME-LIMITING PROPERTIES
Filed March 15, 1961 4 Sheets-Sheet 1

_United States Patent Office_

3,198,988
Patented Aug. 3, 1965

3,198,988
NON-CONTACT POINT RELAY FOR A.C. AND D.C.
HAVING DIRECTIONAL AND TIME-LIMITING
PROPERTIES
Yoriyuki Nieda, 5 Matsugaoka Kanagawa-ku,
Yokohama, Japan
Filed Mar. 15, 1961, Ser. No. 96,014
Claims priority, application Japan, Mar. 18, 1960,
35/8,402
8 Claims. (Cl. 317—27)

The present invention relates to a small noncontact point relay for A.C. and D.C. having directional, time-limiting and previously notifying properties, wherein, in case an electric current is passed in one direction through a semiconductor plate, and if an external magnetic field acts at right angles to the direction of said electric current, an electromotive force will occur at an end of the plate perpendicular to both directions by virtue of said E.M.F. an electric current being passed along a rotary coil and a rotating force occurring along said rotary coil, and then a circuit to be controlled being adapted to open and close by means of a rotary shaft and the electromotive force of the semiconductor plate mounted on said shaft.

In the usual well-known relay, since almost all the movable contact points are made of pure silver, the resulting difficulty in up-keep of contact points frequently causes operational errors. Accordingly various defects have occurred in the handling and other points; namely, a wrong operation (inoperation is also involved) of relays due to an unsatisfactory contact of the contact points in one unit relay of the several tens or hundreds of unit relays forming one relay system, for instance, pilot wire relay or carrier relay and the like in the electric power system, will give an important effect on the electric power system. Therefore, non-erroneous operational, in other words, non-contact point relays are strongly desired; however, no time-limiting and directional non-contact point relays are available as yet at the present. For instance, in induction relays, a rotary disc starts and the operation of the relay is completed first when the main contact point comes in contact, and therefore, it has been impossible for such relays to indicate possible accidents on the way from the start to a point immediately before the contact point coming in contact.

For this reason, the present invention has for the object of removing above-mentioned defects and providing non-contact point A.C. and D.C. relays having directional and time-limiting properties and also being capable of notifying accidents. The substance of this invention lies in a relay, wherein a main electroconductive rotary shaft is placed between both upper and lower magnetic poles, said main rotary shaft being secured to two, upper and lower, semiconductor plates respectively, said lower semiconductor plate being wound starting from the extremity of both sides and parallel to said main rotary shaft, and output wire being pulled out from both sides of the upper semiconductor plate.

Thus, according to the present invention, the defects of above-mentioned known relay can be eliminated for the following reasons: namely, the E.M.F. of the semiconductor is proportional to the product of electric current and magnetic flux passing respectively through the upper and lower semiconductor plates and the E.M.F. generated is proportional to a revolving force of a rotor. Therefore, according to this invention, an entirely non-contact point relay can be obtained, because the rotary angle of the rotor and E.M.F. of the upper semiconductor plate can be obtained proportional to the input, i.e. a product of electric current and magnetic flux.

In the relay of this invention, the operation from the time of starting to the opening or closing operation can be simply recorded or indicated with a pointer. Therefore, a large advantage can be obtained in that a notice can be issued extremely easily at any suitable point of electromotive force of the upper semiconductor plate; in addition, it can be used as a meter relay.

For instance, when in the case of an overcurrent relay, a circuit to be controlled is opened or closed at E.M.F. of one volt on the semiconductor plate of the relay according to this invention, when the exciting current is set at 1 ampere, through an alarm circuit, such a bell circuit is passed a current by 0.8 volt E.M.F. corresponding to 0.8 ampere of magnetizing current to give a bell alarm, thus enabling to notify an excess current and preventing the rail road or rail road utensil from burning loss such as incidents by limiting the electric current of the main rail road.

Further, the relay according to the present invention has a time-limiting, directional properties and no contact point as described above. Moreover, it makes it possible that the occurrence of accidents and irregularities is known beforehand and the opening and closing operations are effected. Furthermore, going a step further, it can be utilized in making notifications as an accident-foretelling relay.

On the other hand, the relay according to this invention is compact and light weight, that is, its size may be about 2 cm. in diameter and its length is below 4 cm. so that its volume and weight of the relay are approximately one-tenth of the usual relay. Moreover, a wide range of time-limitation can be obtained most simply; consumption of electric power is extraordinarily low; relay life is semipermanent; and, the relay is highly resistant to mechanical vibration. When the upper and lower semiconductor plates (later designated as 19 and 1), are made of a material having a high Hall coefficient, for instance, indium-arsenide (In-As), an extremely excellent temperature coefficient and a high accuracy can be provided, since a tolerance of 0.1% for a temperature variation of 30° C. can be obtainable in a range from 0° to 150° C. In addition, a highly satisfactory and an accurate temperature characteristic can be obtained in the electric source for a controlled circuit, i.e. an output of the relay can be obtained without any changes in the construction for both A.C. and D.C. electromotive force; because the relay has a miniature size and non-contact point construction, upkeep and inspection are not required substantially; and as a low cost relay in all sorts of relay systems, the present relay can find a wide range of applications, such as for opening or closing, automatic control and automatic adjustment and so forth.

The present invention will further be described in detail with respect to several embodiments as illustrated in the accompanying drawings. However, the present invention is not limited by the following descriptions and various modifications may be of course possible insofar as it is without departing from the scope and spirit of the invention as referred to in the claims later. Similar symbols are used for similar parts throughout the drawings, in which FIG. 1 is an oblique view schematically illustrating the operational principle for the minimum size, non-contact point relay according to this invention;

Figure 1:
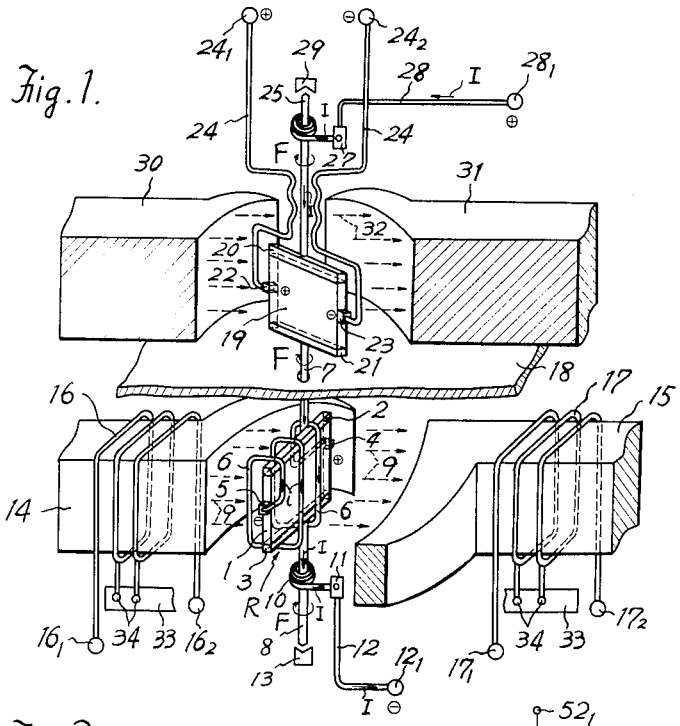

FIGURE 1 illustrates an operational principle of a minimum size non-contact point relay according to the present invention having directional and time-limiting properties; a lower semiconductor plate 1 is arranged between magnetic fluxes 9 of an electromagnet 14 (N-pole) and an electromagnet 15 (S-pole); current terminal members 2 and 3 are arranged at the upper and lower end portions of said lower semiconductor plate, whereby a main shaft electric current I flows from a main rotary shaft 7 through the electric current terminal member 2, lower semiconductor plate 1, electric current terminal member 3 and a main rotary shaft 8. Electromotive force terminal members 4 and 5 are arranged in a perpendicular direction to the direction of electric current of lower semiconductor plate 1; a main rotary coil 6 is wound parallel to main current I and perpendicularly to the plate body surface of lower semiconductor plate 1; one end of a coil spring 10 of a good quality phosphor bronze is secured to the main rotary shaft 8, the other end of coil spring 10 is fixed to a current feeding terminal 11 which is connected to a D.C. source (not illustrated in the drawings) with wire 12; a rotor R consists of lower semiconductor plate 1 and rotary coil 6; electromagnets 14 and 15 are wound respectively with exciting coils 16 and 17, and each coil has a plurality of intermediate electric current taps 34 secured to a tap plate 33 in order to suitably select exciting current.

A main rotary shaft 25 is provided coaxially with main rotary shafts 8 and 7 between fluxes 32 due respectively to permanent magnets (or electromagnets) 30 (N-pole) and 31 (S-pole). An upper semiconductor plate 19 is provided with a plate surface parallel to those main rotary shafts between said main rotary shafts 7 and 25 and also parallel to fluxes 32; similarly as the lower semiconductor plate, the upper semiconductor plate 19 is provided with electric current terminal members 20 and 21 on its upper and lower ends whereby main shaft electric current I flows from main rotary shaft 25 through terminal member 20, upper semiconductor plate 19, terminal member 21 and main rotary shaft 7. Furthermore, the upper semiconductor plate 19 is provided with electromotive force terminals 22 and 23 along a perpendicular direction with main shaft electric current I, said electromotive force terminal members being connected with extremely thin plastic wire 24; the main rotary shaft 25 is connected with one end of a coil spring 26 of high grade phosphor bronze, the other end of said coil spring 26 is secured to feeding terminal 27 which is connected to a D.C. source (not illustrated) with electric wire 28.

In the foregoing description, the positions where the feeding terminals 11 and 27 adjust the time limit by suitably shifting said positions in such a manner that the braking force of coil springs 10 and 26 may be adjusted. Moreover, the main shaft current I is an electric current which flows along a circuit from D.C. source (not illustrated) through coil springs 26 and 10, upper semiconductor plate 19 and lower semiconductor plate 1. 29 and 13 are bearings adapted to pull main rotary shafts 25 and 8 from above and below by means of metal cords or wires (both are not illustrated) generating no working torque; 18 shows a metallic insulating plate which magnetically insulates the upper electrode from the lower electrode; $16_1$ and $16_2$, $17_1$ and $17_2$ are fixing terminals respectively for exciting coils 16 and 17; $24_1$ and $24_2$ are fixing terminals for wire 24; $12_1$ and $23_1$ are fixing terminals respectively of wires 12 and 28 for main shaft circuit.

For the upper and lower semiconductor plates, for instance, germanium is suitable as an elemental metal and, for instance, indium, antimonide or indium arsenide is suitable as an intercrystalline compound. The both surfaces of said upper and lower semiconductor plates are insulated respectively from respective plate body and sandwiched with thin high magnetic permeability metal sheets, in order to contract magnetic fluxes 32 and 9, and it is, of course, obvious to increase the E.M.F. of said upper and lower semiconductor plates.

The operational manner is described in the following with the above-mentioned construction showing the principle of the present invention.

In FIG. 1, when terminals $28_1$ and $12_1$ for the main shaft current are connected respectively to ⊕ and ⊖ of unillustrated D.C. source, the main shaft current I flows from the fitting terminal $28_1$ for wire 28 of the main shaft circuit, passing through the feeding terminal 27, coil spring 26, main rotary shaft 25, current terminal member 20, upper semiconductor plate 19 and current terminal member 21, further passing the main shaft circuit through the main rotary shaft 7, current terminal member 2, lower semiconductor plate 1, current terminal member 3, main rotary shaft 8, coil spring 10, feeding terminal 11, wire 12 and fitting terminal $12_1$ of said wire, i.e. flows downwards from above as viewed towards the drawing.

As seen in the drawing, the lower semiconductor plate 1 and upper semiconductor plate 19 are fixed to main rotary shafts 25, 7 and 8 at the position where they meet perpendicularly each other, so that main shaft current I flows by a D.C. source through the upper and lower semiconductor plates 19 and 1. In the case of over current relays, the secondary circuit side of a transformer (for instance, a numerical symbol 53 in FIG. 2) in a protected circuit is connected with exciting coils 16 and 17 to allow exciting current flow. In the case of the over current relays, when the secondary, circuit of electrical potential transformer (not illustrated) is connected therewith and excited with a current proportional with the potential, magnetic fluxes 9 are caused to occur in a direction of arrow, i.e. from the left to right in the drawing.

Accordingly, when the secondary current of said transformer 53 (FIG. 2), i.e. input current of exciting coils 16 and 17 is A.C., said exciting coils are excited respectively by D.C. output of said A.C. rectified with a rectifier 36, and the main shaft current (D.C.) I can be passed in the main shaft current circuit which is connected in parallel with the exciting coils 16 and 17 to upper and lower semiconductor plates 19 and 1 through a current controlling resistance 35.

In th main shaft current circuit of the present relay, A.C. E.M.F. occurs at electromotive force terminal members 22, 23 and 4, 5, when D.C. is passed through the main shaft current circuit and the upper and lower semiconductor plates 19 and 1 are placed in an A.C. magnetic field (exciting coils 16, 17 and permanent magnets are selected as electromagnets and an unillustrated exciting coil is excited A.C.), and if said body plate is placed in a D.C. magnetic field, D.C. E.M.F. will occur; therefore, either A.C. or D.C. electromotive force can be generated at output terminals 24, $24_2$ without changing the construction, thus enabling to provide a very convenient relay for both A.C. and D.C.

The A.C. electromotive force of the output terminals are amplified simply and easily. Therefore, in case amplification is required for the opening or closing operation, this relay is very convenient.

Thus, the lower semiconductor plate 1 is in a position perpendicular to fluxes 9 at the time of starting, and when the main shaft current I flows, E.M.F. ⊕ occurs at electric power terminal 4 and similarly E.M.F. ⊖ occurs at electric power terminal 5, and electric current I flows in the direction of an arrow on rotary coil 6 and simultaneously a rotating force F occurs and the rotary coil 6 starts against the braking force of coil springs 10 and 26, and as a result, the main rotary shafts 8, 7 and 25 begin to rotate in the direction of an arrow and stop at stationary points as they have revolved 90° (the points are not shown in the drawings).

In an instance of over current relays, since there are many current taps 34 in exciting coils 16 and 17, when any suitable current tap is chosen, the exciting current passing through the exciting coils 16 and 17 reaches above the adjusted value of the respective current tap and the rotating force F exceeds the braking force of coil springs 10 and 26, with the result that said main rotary shaft commences to rotate. The upper semiconductor plate 19 in a position perpendicular to lower semiconductor plate 1 is in a position parallel to magnetic fluxes 32 in the direction of an arrow generated by permanent magnets (or electromagnets) 30 and 31 at the time of starting, but no electromotive force occurs at E.M.F. terminals 22 and 23. In case the lower semiconductor plate 1 begins to rotate, the upper semiconductor plate 19 secured coaxially with said lower semiconductor plate 1 turns gradually from a position parallel to fluxes 32 to a position for the plate body to receive said magnetic fluxes, and then E.M.F. ⊕ occurs at E.M.F. terminal 22, and similarly E.M.F. ⊖ occurs at E.M.F. terminal 23; and the upper semiconductor plate turns further 90°, and said E.M.F. reaches to the maximum value, where said upper semiconductor plate stops. When all sorts of double controllers, such as switches are connected to fitting terminals 24, and 24₂ of wire 24 by said electromotive force, the circuit can be opened versus closed by the output of the relay according to this invention.

Figure 3:
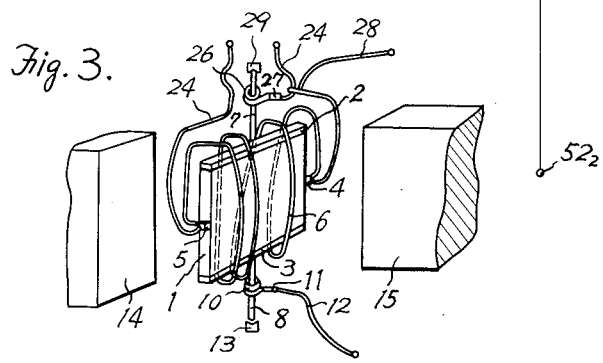
FIG. 3 is an oblique view illustrating the instance wherein with one semiconductor plate shown in FIG. 1 a rotary coil and E.M.F. wire are used in series.

The relay according to the present invention, wherein the plate surfaces of the upper and lower semiconductor plates 19 and 1 are positioned perpendicularly to fluxes 32 and 9, or alternatively the upper semiconductor plate 19 and permanent magnets 30 and 31 are eliminated and simply extremely soft and flexible wires 24 are connected respectively with E.M.F. terminals 4 and 5 of lower semiconductor plate 1 as shown in FIG. 3, i.e. when wires 24 are connected in parallel circuits respectively to rotary coils 6, the electromotive force will become the maximum at angular position of zero, and will decrease with further rotation, thereby enabling to perform the opening and closing operations of controlled circuit, can also be used as an automatic controllable relay.

Thus, when the exciting current passing through exciting coils 16 and 17 increases above the adjusted value, a rotating force F generates on the main rotary shaft 8, 7 and 2. Accordingly, the main rotary shaft rotates continuously from zero to the maximum value of 90° in a certain fixed time. In order to adjust accurately and as desired the time required by rotation from zero to the maximum, the fixing positions for feeding terminals 27 and 11 are shifted and fixed so as to weaken both or one braking force, under utilization of high or low braking force of coil springs 10 and 26. Then the rotating time of rotor R comprising the lower semiconductor plate 1 and rotary coil 6 becomes shorter ranging from a few tenth seconds to a few hundredth seconds; and when the braking force is increased, the rotating time becomes shorter and ranges from several seconds to several ten seconds. Therefore, any suitable operational time, i.e. time-limiting can be adjusted most simply and accurately.

On the other hand, a relay having various kinds of time-limit (including an instantaneous time-limit; fixed time limit; reverse time-limit; reverse time-limit fixed time-limit, etc.) can be provided by selecting appropriately the combination of braking forces of coil springs 10 and 26, or shape and arrangement of magnetic poles, the direction and intensity of magnetic fluxes, or fitting angles of upper or lower semiconductor plates 19 and 1, or exciting current, the direction and intensity of main shaft current, etc.

As obvious from the foregoing description, according to the present invention, an extremely small and light weight relay can be fabricated by the use of semiconductor plates; for instance, the size is around 2 cm. diameter and 4 cm. long, the weight of said relay being about one-tenth of an ordinary relay. Moreover, an instantaneous overcurrent is passed through exciting coils 16 and 17, and an electromotive force occurs through the upper semiconductor plate 19 due to rotary inertia of rotary coil 6; and since said E.M.F. is geared to rotate to the maximum value, for instance, a braking magnet used for an ordinary relay and a rotary disc (also unillustrated in the drawings) having many small holes are secured, braking and constant velocity rotation can, of course, be performed.

The operation of the relay is referred to above with respect to an overcurrent relay by way of example. Non-contact point relay for A.C. and D.C. having directional, time-limiting and preliminary announcing properties according to this invention can be used, of course, as an overcurrent relay, and as an overvoltage relay, differential relay, electric power relay, grounding relay, undervoltage relay, earthing relay and short-circuit relay. Moreover, the present relay can also be used as a pilot wire relay, impedance relay, etc. after several units of said relays or several tens of the relays are put together in combination. In the following, the manner in which the present application is used, will be described with respect to the outline of the construction and operation.

For instance, in the case of the relay according to the present invention (in the following descriptions, it is designated simply as the present relay) being used as a differential relay, entirely similarly to an usual method, first two convertors are connected in series as in a conventional differential relay, and then the present relay referred to above may be bridged as an overcurrent relay. In other methods, through exciting coils 16 and 17 of the present relay are respectively passed an exciting current reversely by two transformers so that magnetic fluxes may be contradicted with each other. The magnetic fluxes flow mutually in a reverse direction normally. Therefore, in the lower semiconductor plate 1, no E.M.F. occurs. However, if current of either one transformer increases, an E.M.F. will occur in the lower semiconductor plate and rotor R (comprising the lower semiconductor plate 1 and rotary coil 6) commences to rotate and the direction of rotation alters depending on the direction of the exciting current. Thus, the present relay can be made as an indicator of a directional property and as a magnetic equilibrium differential relay.

Moreover, the present relay which not only operates depending on the magnitude of electric current, but also has a capacity of distinguishing the direction of a current, in other words, has a directional property with respect to the current. Therefore, the present relay can be used as a reverse power relay.

For instance, when the direction of exciting current passing through exciting coils 16 and 17 or the direction of main shaft current I becomes reverse, the electromotive force occuring on the lower semiconductor plate 1 being ⊖ at E.M.F. terminal member 4 and ⊕ at E.M.F. terminal member 5, the rotary force F acts reversely, resulting in a reverse rotation of upper semiconductor plate 19 and consequently ⊖ E.M.F. occurs at E.M.F. terminal member 22 and similarly ⊕ E.M.F. occurs at E.M.F. terminal member 23. Since the direction of the electric current passing through a protecting circuit or transformer by the polarity of E.M.F. occuring at fitting terminals $24_1$ and $24_2$ of wire 24 output of the circuit can be distinguished, a directional relay can be provided which is extremely efficient in the selective disconnection of accidental location.

In case the present relay is, for instance, an automatic control relay, exciting coils 16 and 17 are excited, for instance, with a certain fixed amount of loading current and a certain rotary angle is adjusted under the electromotive force of lower semiconductor plate 1; with respect to said fixed rotary angle, the position of permanent magnets (or electromagnets) 30 and 31 are shifted so that the upper semiconductor plate 19 may be positioned in parallel to magnetic fluxes 32. As a result, when the loading current increases above a certain fixed value, the rotary angle of rotor R will also be increased; accordingly, the upper semiconductor plate 19 begins to receive magnetic fluxes 32 on the plate surface, and E.M.F. $\oplus$ occuring at E.M.F. terminal member 22, and similarly E.M.F. $\ominus$ at E.M.F. 23 and when said E.M.F. decreases below a certain value, the rotary angle will become small, and simultaneously the upper semiconductor plate 19 will receive fluxes 32 on the back surface, with the result that E.M.F. $\ominus$ appears at E.M.F. terminal 22, similarly E.M.F. $\oplus$ occurs at E.M.F. 23. Accordingly when an operational circuit (not-illustrated) for all sorts of automatic control means is connected respectively to fitting terminals $24_1$ and $24_2$ for electric wire 24, the current passing through the operational circuit is in a positive or negative direction according to the increase or decrease of said loading current, thereby for instance various electrical or mechanical quantities being automatically adjusted and controlled.

The foregoing description outlines the manner of the uses of the present invention, while the construction and the operational manner of the present invention are described in further detail in connection with the accompanying drawings in the following.

Figure 2:
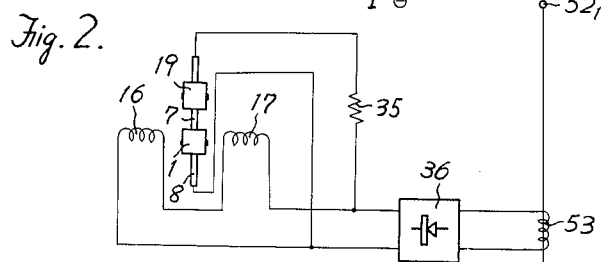
FIG. 2 is a schematic circuit diagram showing only electric circuits for exciting and main shaft currents.

FIG. 2 represents an electric circuit for exciting currents and main shaft current of FIG. 1 illustrating schematically in an oblique view the operational principle of the present invention; and FIG. 3 is an oblique view schematically illustrating cases of using a rotary coil and E.M.F. wire in series by means of a semiconductor body; each of those drawings will serve to the following explanation.

Figure 4:
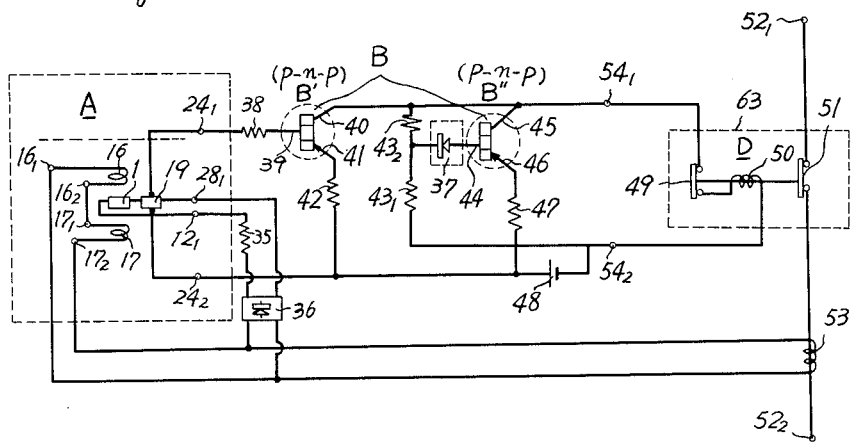
FIG. 4 is an explanatory circuit diagram showing a type of relay wherein the relay according to the present invention is used in a transistor D.C. amplifying circuit.
Figure 5:
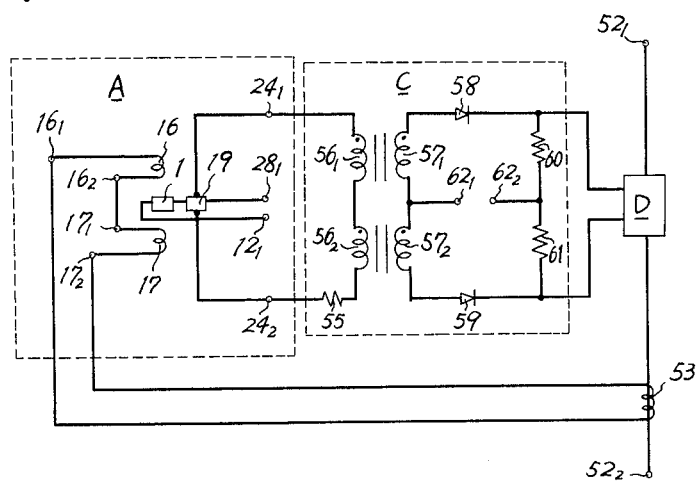
FIG. 5 is an explanatory circuit diagram showing a type of relay wherein the relay the same as before is used in a magnetic amplifying circuit.
Figure 6:
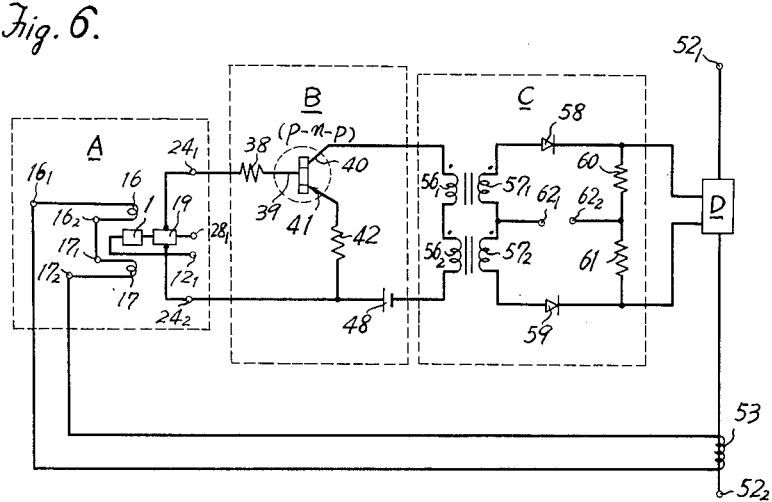
FIG. 6 is an explanatory circuit diagram showing a type of relay wherein the relay the same as before is used in a two step amplifying circuit by the transistor amplifier and magnetic amplifier.

Each of FIGS. 4, 5 and 6 represents a D.C. E.M.F. amplifying circuit wherein the upper semiconductor body 19 is placed in a D.C. magnetic field, of which FIG. 4 illustrates an operational system of an overcurrent protection relay, wherein the D.C. output, i.e. E.M.F. of upper semiconductor plate is subjected to D.C. amplification due to a transistor amplifier and the recontrolled circuit is opened and closed by said output. In FIG. 1, is shown the non-contact point relay according to the present invention having directional and time-limiting properties as shown in FIG. 1 and is designated as A; output terminals 24, and $24_2$ are led to a D.C. amplifying transistor circuit B, said circuit B being subjected to one step-transistor amplification of B' for low output cases and to two step-amplification of B'' for high output cases. The relays illustrated in this drawing are examples of B' amplification and another of B'' two step-amplification. In said D.C. amplification circuits B' and B'', for instance, p-n-p type transistors are used. In this case, 39 and 44 are electrode bases; 41 and 46 are emitters; 40 and 45 are collectors; 38 is an input resistance; 42 and 47 are emitter resistance; $43_1$ and $43_2$ are partial pressure resistance; 37 is a Zener diode of silicon or germanium; 48 is a D.C. electric source; D is a controlled circuit, for instance, a breaker is shown; 49 is a palette switch; 50 is a trip coil; 51 is a main switch; $52_1$ and $52_2$ are main lines; 53 is a transformer; $54_1$ and $54_2$ are output terminals; and 35 represents a current adjusting resistance.

The operational manner will be described. An over- current flows through main lines $52_1$ and $52_2$. If an electric current above the adjusted value of the present relay A flows through a circuit of transformer 53, the rotor R (comprising a lower semiconductor plate 1 and a rotary coil 6) of overcurrent relay A begins to rotate. Thus, the upper semiconductor plate 19 receives fluxes 32 and the electromotive force is generated, and when said rotor rotates at the maximum rotary angle, the upper semiconductor plate 19 generates the maximum E.M.F. Said electromotive force is amplified by transistor circuit B' and B'' to a high output. When an electric current is passed through a controlled circuit D connected with the output circuit, for instance, a trip coil 50 of a breaker, and the main switch 51 is opened; simultaneously a palette switch 49 is also opened; the current flowing through the trip coil 50 reaches also to zero. Then, the overcurrent flowing through main line $52_1$ and $52_2$ can be cut off to protect said main line.

Furthermore, in order to make the operational current accurate for the present relay, a diode 37 of silicon or germanium, in which Zener effect is applied, is used. Since the resistance is extremely large when the output voltage of the transistor-amplifying circuit B'' is below a certain limit no base current passes, i.e. no amplification occurs due to the amplifying circuit B'' and thus the output is zero; when said output voltage becomes below a specific value, base current flows rapidly, and the transistor amplifier circuit B'' performs the amplifying action rapidly, and the breaker D can be put to operate by said output. Thus it is possible to actuate the breaker exactly at a specific point of the relay by using the Zener diode 37. Moreover, in order to subject the upper semiconductor plate 19 to an A.C. excitation, it is of course possible to effect A.C. amplification of the A.C. electromotive force, which occurs at output terimnals $24_1$ and $24_2$ by passing A.C. current through an exciting coil (not illustrated), in a transistor amplification or magneto-amplification circuit.

In the next place, in FIG. 5 is shown a case wherein the present relay A is subjected to D.C. amplification due to magneto amplification circuit C and the controlled circuit D is opened and closed by thus amplified output. In said figure, $12_1$ and $28_1$ represent main shaft current terminals; $56_1$ and $56_2$ represent a pair of control windings; $57_1$ and $57_2$ represent gate windings; 58 and 59 represent rectifiers respectively; 60 and 61 represent connecting resistances; $62_1$ and $62_2$ represent A.C. source terminals; 55 is a control circuit resistance; 53 represents a convertor; and the magneto amplification circuit C represents a half-wave push-pull circuit, of self-feeding back type, and the controlled circuit D represents, for instance, a breaker.

When the output of the present relay A is zero, and as the output of the magneto amplification circuit C becomes also zero, in the circuit both output and input being proportional and said polarity being changed according to the polarity of the input signal; namely, if the direction of electric current (main shaft current or exciting current) flowing through the present relay A is reversed, the rotating direction of rotor R of said relay will be also reversed, with the result that the polarity of output of the upper semi-conductor plate 19 will become also reverse. Accordingly, as the output of magneto amplification circuit C also becomes reverse, such a relay is extremely useful for automatic controlling circuits.

In FIG. 6, is illustrated a case wherein the transistor D.C. amplification circuit B as shown in FIG. 4 is combined with the magneto amplification circuit C as shown in FIG. 5 for a two step amplification, thereby a high output being obtained to perform the opening VS closing operations of the controlled circuit D of a high conductance, for instance, of a breaker; in said figures, symbols and indicating numerals are the same as those appearing in FIGS. 4 and 5; in the magneto amplification circuit D,P-n-P type transistors of the same as those referred to above are used, and said circuit is a self-feeding back type half-wave push-pull circuit.

Figure 7:
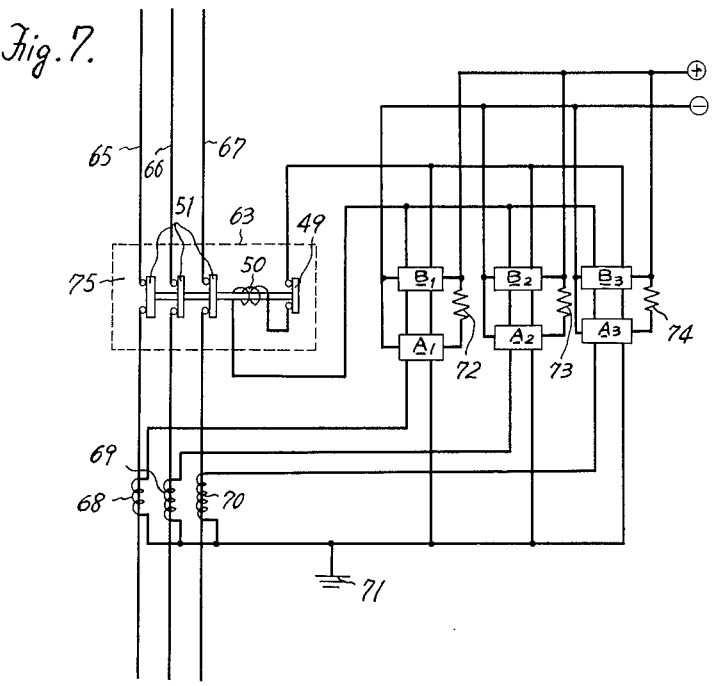
FIG. 7 is an explanatory circuit diagram showing a three phase three wire type of relay for protection of overcurrent wherein a relay the same as before is used in each feeding bus bar.

In the next place, FIG. 7 illustrates an example of a three phase-three wire type overcurrent protective relay wherein the present relay is used on each wire. In said figure, 71 illustrates grounding; transmitting bus bars 65, 66, and 67 are connected with breaker 75; each of said bus bars is provided with a transformer 68, 69 and 70 respectively; each transformer is connected with the exciting coil of said lower magnetic pole; each of the present relays $A_1$, $A_2$, and $A_3$ is secured to each of said bus bar respectively. When a large output is required, said relays are connected respectively with a tip circuit 63 of breaker 75, i.e. the trip coil 50 and palette switch 49, for instance, through transistor amplifiers $B_1$, $B_2$ and $B_3$. In this case, a main shaft current is fed to each respective relays $A_1$, $A_2$ or $A_3$ from D.C. source $\oplus$, $\ominus$ through respective current adjusting resistances 72, 73, and 74.

In addition, the upper semi-conductor plate (corresponding to the upper semi-conductor plate 19 shown in FIG. 1) having said construction of each relay 68, 69 or 70 gives rise to an electromotive force on the said semiconductor plate. Accordingly, each respective output of said E.M.F. is amplified by transistor amplifiers $B_1$, $B_2$ of $B_3$ respectively to constitute a trip circuit 63, thus exciting coil 50 to open main switch 51 and simultaneously also to open palette switch 49 for breaking feeding bus bars $65_1$ 66 and 67. In this case, if through any one of said feeding bus bars 65, 66 and 67 is passed an overcurrent, the relay connected with said line can be operated to cut the breaker 75.

Figure 8:
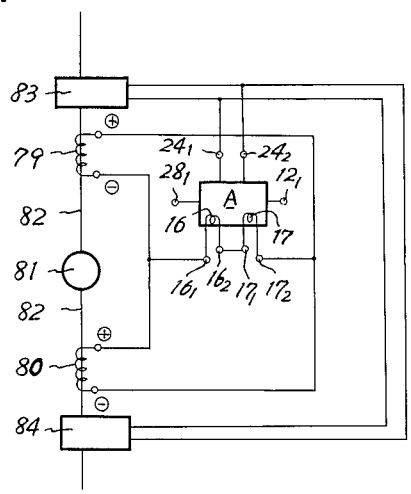
FIG. 8 is an explanatory circuit diagram showing a differential relay type by a relay the same as before.

In the next place, FIG. 8 illustrates by way of example a relay of a type protecting machinery parts or lines by using the present relay for a differential relay. Transformers 79 and 80 arranged before and after a generator 81 are connected mutually in series and differentially, and when the present relay A (the interior part has a construction of an over-current relay) is bridged as illustrated, the generator 81 can be protected by breakers 83 and 84 arranged on both ends of said generator 81 due for instance to an accident current (earth current) inside the generator. In other words, one example of a differential relay for protecting generator 81 is shown.

Two transformers 79 and 80 are connected with their polarity as illustrated in this figure and with the construction being referred to above, the exciting current flowing through exciting coils 16 and 17 of the present relay A will become zero, the current flowing through said transformers 79 and 80 being equal. For instance, if an earth accident occurs on the generator bus bar 82, and consequently if an overcurrent flows through either one of the transformers 79 and 80, only the increased current portion will flow through said relay circuit, i.e. through exciting coils 16 and 17. Therefore, an electric current flows through the trip circuit 63 to be connected with fitting terminals $24_1$ and $24_2$ by the resulting operation of the present relay A, and the breakers 83 and 84 on both ends of the generator 81 being cut, protecting thus said generator from accidents.

Figure 9:
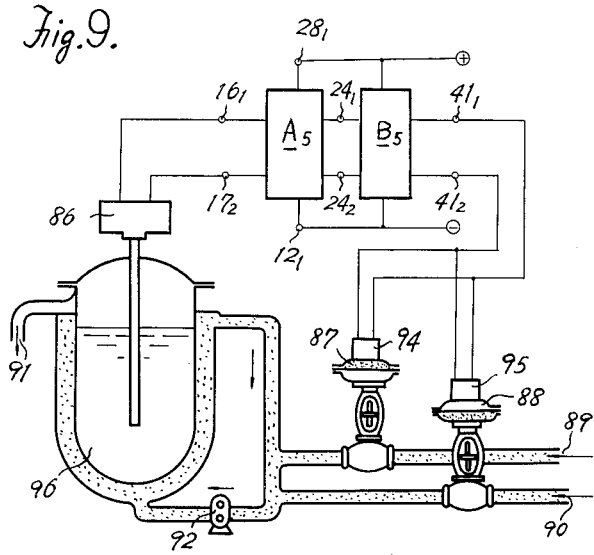
FIG. 9 is a schematic view showing an operational system for an automatic controlling device by a relay the same as before.

In the next place, FIG. 9 illustrates schematically the operation of the present relay used as an automatic electrical and mechanical apparatus. For instance, in order to keep constant the temperature of a reaction kettle 96 in the synthetic industry, an exciting coil (not illustrated) of a controlling relay $A_5$ in which the present relay is used is excited by the output of temperature measuring device 86, and the output is amplified by a transistor amplifier $B_5$, and exciting devices 94 and 95 for an operational value are actuated by the output and the automatic control of temperature is effected by feeding water from leading pipes 89 and 90 for feeding hot or cold water to the reaction kettle 96. With the reaction kettle 96 held at a fixed temperature, the exciting coils 16 and 17 of the present relay $A_5$ are excited in series, and when said reaction kettle is adjusted appropriately at a fixed temperature, i.e. if at fixed temperature, as shown in FIG. 1, the plate surface of upper semiconductor plate 19 is positioned in parallel to magnetic fluxes 32, the output of the present relay $A_5$ and that of the transistor amplifier $B_5$ change the polarity from $\oplus$ to $\ominus$ or $\ominus$ to $\oplus$ alternately as they pass at the fixed temperature, namely the direction of current is reversed, thereby exciting the exciter 94 for positive operational value and the exciter 95 for reverse operational value, to control compressed air (not illustrated) for suitably feeding cold or hot water to the reaction kettle 96 through the cold water or hot water transmitting pipe 90 or 89, thus enabling the automatic control of the temperature of said reaction kettle to keep the fixed temperature. In this case, 91 is an overflow and 92 is a circulating pump.

Further, in order to measure the operational condition of the present relay $A_5$, it can readily be done with indicated values on a graduation plate (not illustrated) indicated by a pointer and a graduation plate (both are not shown in the drawings), which are provided on the rotary shaft of the present relay, for instance, on the rotary shaft 25 in FIG. 1. In the case of simple overcurrent or overvoltage relays, in FIG. 1, it is possible to further minimize the relay by arranging in the same fluxes 9 the lower semiconductor plate 1 and the upper semiconductor plate 19 between the electromagnets 14 and 15, i.e. the lower magnetic poles, without resorting permanent magnets (or electromagnets) 30 and 31, i.e. the upper magnetic poles, and magnet insulating plate 18.

What I claim is:

1. In a non-contact point relay for A.C. and D.C. having directional and time-limiting properties, the combination comprising upper and lower magnetic poles, an electroconductive rotary shaft disposed between said upper and lower poles, upper and lower semiconductor plates secured to said rotary shaft, coil means wound on said lower semiconductor plate and being parallel to said rotary shaft, and output wires extending from said upper semiconductor plate whereby said upper and lower semiconductor plates are rotated by current therethrough with flux produced by said coil means and said upper semiconductor plate produces an electromotive force.

2. The relay as recited in claim 1 for controlling a circuit having a circuit breaker and a transformer, a coil wound on said lower magnetic pole, a secondary coil of said transformer being connected to said wound coil, a rectifier connected between said secondary coil and said wound coil to produce a D.C. current, a decreasing voltage resistor connected between said rectifier and said upper semiconductor plate, means to amplify said electromotive force, and said circuit breaker being operated by the amplified current.

3. The combination as recited in claim 2, wherein said amplifying means comprises a transistor amplifier.

4. The combination as recited in claim 2, wherein said amplifying means comprises a magnetic amplifier.

5. The combination as recited in claim 2, wherein said amplifying means comprises a transistor amplifier and a magnetic amplifier to provide a double stepped amplication of said electromotive force.

6. The relay as recited in claim 1 for a three phase, three wire system having a circuit breaker and a transformer for each bus bar, a coil wound on said lower magnetic pole, said circuit breaker and said transformer being connected to said wound coil, amplifying means conected to said circuit breaker whereby overcurrent passed through more than a single bus bar causes actuation of said switch.

7. The relay as recited in claim 1 for a differential relay mechanism having a generator and a circuit breaker, a transformer connected between said generator and said circuit breaker whereby overloading in the generator is differentially detected by the transformer.

8. The relay as recited in claim 1 for automatically controlling the temperature of a chemical industrial reaction kettle having a thermometer, a coil wound on said lower magnetic pole and being connected to said thermometer amplifying means to amplify the output of said thermometer, a valve exciter actuated by the amplified output to control compressed air and hot and cold water fed to said reaction kettle.

No references cited.

SAMUEL BERNSTEIN, *Primary Examiner.*